March 21, 1933.  A. S. FITZ GERALD  1,902,496
HIGH FREQUENCY MEASUREMENT
Filed May 27, 1931
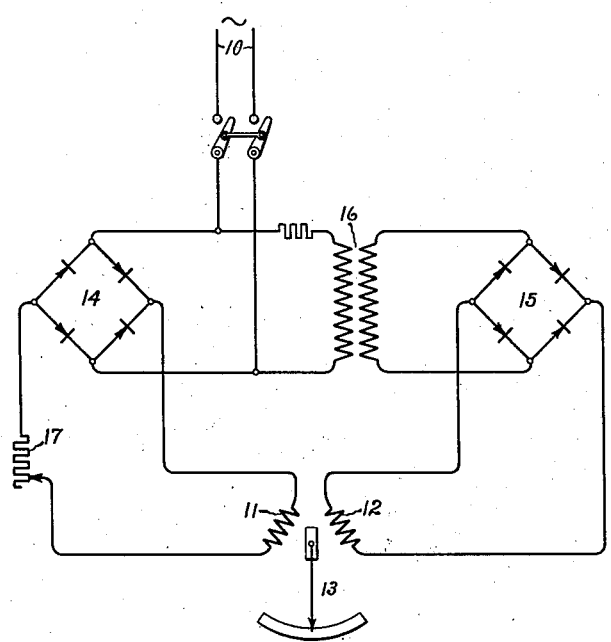
Inventor:
Alan S. FitzGerald,
by Charles E. Tullar
His Attorney.

Patented Mar. 21, 1933

1,902,496

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

HIGH FREQUENCY MEASUREMENT

Application filed May 27, 1931. Serial No. 540,488.

My invention relates to apparatus for the measurement of alternating current frequency, particularly high frequencies which cannot be measured by the usual frequency meter.

In carrying my invention into effect I compare two direct currents, preferably by means of an ordinary differential measuring instrument, both currents being derived from the circuit the frequency of which it is desired to measure. One of these currents is proportional to the voltage of the circuit and is independent of frequency. The other current is proportional to both the voltage and frequency of the circuit. In the differential instrument the voltage components cancel and an indication proportional to frequency is thus obtained.

The features of my invention which are believed to be novel and patentable will be pointed out in the claims appended hereto. For a better understanding of my invention reference is made in the following description to the accompanying drawing showing a preferred form of the invention employing a sensitive direct current differential instrument excited from the high frequency source through rectifiers, a transformer being employed in one connection to vary the energy therethrough in proportion to frequency.

In the drawing, 10 represents alternating current terminals for connection to an alternating current circuit of high frequency, the frequency of which it is desired to measure. This circuit is arranged to supply energy to the coils 11 and 12 of a direct current instrument 13 of the differential type. A direct current instrument is preferable because of its high sensitivity since ordinarily it is undesirable to draw any material amount of energy from a circuit such as is contemplated.

Coil 11 of the instrument is energized from 10 through a full wave rectifier represented at 14. The coil will thus be supplied by a direct current which is proportional to the voltage at 10 but which is substantially independent of frequency variations. Coil 12 is supplied through a second full wave rectifier indicated at 15 which in turn is supplied through the transformer 16 from 10. The current supplied to coil 12 will thus be proportional to the voltage at 10 and will also vary with the frequency because of the transformer 16.

The differential influence of the current in the two coils of the instrument will thus vary as the frequency varies since the components which are proportional to voltage changes will cancel. The instrument will therefore give a deflection proportional to the frequency of the high frequency source.

Any error introduced by reason of the use of rectifiers 14 in the circuit of coil 11 will be counterbalanced by a similar error introduced by reason of rectifiers 15 in the circuit of coil 12. The instrument deflection will thus be independent of any frequency or temperature errors of such rectifiers.

The particular form of differential instrument employed is not important. The instrument represented is provided with stationary coils 11 and 12 placed at an angle to each other and with a magnetic vane armature which tends to align itself with the resultant field. A calibrating resistance 17 may be included in the circuit of coil 11 and the scale distribution of the instrument may be modified as desired by biasing the armature with a spiral spring.

At a given frequency the two coils will produce equal fields and the instrument armature will take a mid-position substantially as represented. At a lower frequency, coil 11 will predominate due to the change in the transformer action with frequency variations. Other forms of frequency responsive devices may be used in one of the circuits to produce the desired result, and other means may be used for measuring the differential effect of the direct currents supplied by the rectifiers. The rectifiers need not necessarily be of the dry contact type indicated.

What I claim as new and desire to secure by Letters Patent of the United States, is:—

1. Frequency measuring apparatus comprising a differential direct current instrument having two supply circuits, a source of alternating current supply, a rectifier having its direct current terminals connected to supply one of said instrument circuits and having its alternating current terminals connected to said source of supply, a second rectifier having its direct current terminals connected to supply the other instrument circuit, and a transformer connected between said source of supply and the alternating current terminals of the second mentioned rectifier for varying the voltage supplied to the latter in proportion to the frequency of said source.

2. Frequency measuring apparatus comprising alternating current supply terminals, rectifier means supplied directly from said terminals, a second rectifier means, a transformer connected between said second rectifier and supply terminals and means for measuring the differential effect of the direct currents supplied by said rectifiers.

In witness whereof, I have hereunto set my hand.

ALAN S. FITZ GERALD.